(12) United States Patent
Karmarkar

(10) Patent No.: US 8,719,621 B1
(45) Date of Patent: May 6, 2014

(54) SOLID-STATE DISK CACHE ASSISTED REDUNDANT ARRAY OF INDEPENDENT DISKS

(75) Inventor: Sandeep Karmarkar, Pune (IN)

(73) Assignee: Marvell International Ltd., Hamilton (BM)

( * ) Notice: Subject to any disclaimer, the term of this patent is extended or adjusted under 35 U.S.C. 154(b) by 474 days.

(21) Appl. No.: 13/086,767

(22) Filed: Apr. 14, 2011

Related U.S. Application Data

(60) Provisional application No. 61/331,765, filed on May 5, 2010.

(51) Int. Cl.
*G06F 11/00* (2006.01)

(52) U.S. Cl.
USPC ............ 714/6.24; 714/6.22; 714/6.2; 714/6.1

(58) Field of Classification Search
USPC ........................................ 714/6.2, 6.22, 6.24
See application file for complete search history.

(56) References Cited

U.S. PATENT DOCUMENTS

| | | | |
|---|---|---|---|
| 5,195,100 A | 3/1993 | Katz et al. | |
| 5,233,618 A | 8/1993 | Glider et al. | |
| 5,313,585 A | 5/1994 | Jeffries et al. | |
| 5,469,453 A | 11/1995 | Glider et al. | |
| 5,475,697 A | 12/1995 | Katz et al. | |
| 5,581,715 A | 12/1996 | Verinsky et al. | |
| 5,589,998 A | 12/1996 | Yu | |
| 5,600,662 A | 2/1997 | Zook | |
| 5,602,857 A | 2/1997 | Zook et al. | |
| 5,629,949 A | 5/1997 | Zook | |
| 5,696,775 A | 12/1997 | Nemazie et al. | |
| 5,758,054 A | 5/1998 | Katz et al. | |
| 6,125,469 A | 9/2000 | Zook et al. | |
| 6,367,047 B1 | 4/2002 | McAuliffe et al. | |
| 6,381,706 B1 | 4/2002 | Zaczek | |
| 6,546,440 B1 | 4/2003 | Verinsky et al. | |
| 6,584,527 B2 | 6/2003 | Verinsky et al. | |
| 6,636,908 B1 | 10/2003 | Winokur et al. | |
| 6,654,862 B2 | 11/2003 | Morris | |
| 6,721,828 B2 | 4/2004 | Verinsky et al. | |
| 6,728,855 B2 | 4/2004 | Thiesfeld et al. | |
| 6,934,725 B1 | 8/2005 | Dings | |
| 6,968,404 B2 | 11/2005 | Verinsky et al. | |

(Continued)

OTHER PUBLICATIONS

Technical Brief: RAID 6: Double-parity RAID, commonly known as RAID 6, safeguards against data loss by allowing up to two consecutive drive failures; AMCC; <http://www.3ware.com/products/pdf/RAID_6_techbrief_112906.pdf > 2005; 2 Pages.

*Primary Examiner* — Sarai Butler

(57) ABSTRACT

A system includes a write module, a read module, and a parity module. The write module is configured to modify first user data stored on a first member of a redundant array of independent disks (RAID) using second user data. The read module is configured to read the first user data and first parity data corresponding to the first user data from a solid-state disk associated with the RAID if at least one of the first user data and the first parity data are stored on the solid-state disk, or from the RAID if the at least one of the first user data and the first parity data are not stored on the solid-state disk. The parity module is configured to generate second parity data based on the first user data, the second user data, and the first parity data.

20 Claims, 4 Drawing Sheets

(56) References Cited

U.S. PATENT DOCUMENTS

| | | |
|---|---|---|
| 6,981,171 B2 | 12/2005 | Hashemi |
| 7,111,228 B1 | 9/2006 | Ricci |
| 7,178,086 B2 | 2/2007 | Hassner et al. |
| 7,313,721 B2 | 12/2007 | Ashmore |
| 7,418,645 B2 | 8/2008 | Srivastava |
| 7,559,009 B1 | 7/2009 | Ricci |
| 7,617,352 B2 | 11/2009 | Mukaida et al. |
| 7,836,379 B1 | 11/2010 | Ricci et al. |
| 2006/0179345 A1* | 8/2006 | Subbarao .................. 714/6 |
| 2007/0180298 A1* | 8/2007 | Byrne et al. ............... 714/6 |
| 2007/0245173 A1* | 10/2007 | Elliott et al. ............. 714/52 |
| 2009/0235114 A1* | 9/2009 | Igashira et al. ............ 714/6 |
| 2010/0257306 A1* | 10/2010 | Kawaguchi ................ 711/103 |

* cited by examiner

SOLID-STATE DISK CACHE ASSISTED REDUNDANT ARRAY OF INDEPENDENT DISKS

CROSS-REFERENCE TO RELATED APPLICATIONS

This application claims the benefit of U.S. Provisional Application No. 61/331,765, filed on May 5, 2010. The disclosure of the above application is incorporated herein by reference in its entirety.

FIELD

The present disclosure relates generally to data storage systems and more particularly to Redundant Array of Independent Disks (RAID) systems using solid-state disks as cache.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A Redundant Array of Independent Disks (RAID) is a data storage system that stores data on an array of disks and that protects the data from disk failures using different techniques. Depending on the techniques used, a RAID can provide different levels of protection. The levels are identified as RAID0, ..., RAID5, and so on. In RAID0, data is striped across multiple disks, but no parity or mirroring is used. Consequently, data is lost if a disk fails. In RAID5, data is striped across all the disks, and parity is distributed and stored across all the disks. Consequently, if a disk fails, data stored on the failed disk can be rebuilt from the data and the parity stored on the disks that are functioning normally. While RAID5 uses single parity to protect against single disk failures, RAID6 uses dual parity to protect against two disk failures.

SUMMARY

A system comprises a write module, a read module, and a parity module. The write module is configured to modify first user data stored on a first member of a redundant array of independent disks (RAID) using second user data. The read module is configured to read the first user data and first parity data corresponding to the first user data from a solid-state disk associated with the RAID if at least one of the first user data and the first parity data are stored on the solid-state disk, or from the RAID if the at least one of the first user data and the first parity data are not stored on the solid-state disk. The parity module is configured to generate second parity data based on the first user data, the second user data, and the first parity data.

In another feature, the write module is further configured to write the second parity data on the RAID in response to writing the second user data on the first member and to write the second user data and the second parity data on the solid-state disk.

In other features, the write module is further configured to write third user data to a second member of the RAID after writing the second user data and the second parity data on the RAID and the solid-state disk. The third user data modifies fourth user data stored on the second member. The read module is further configured to read the second parity data from the solid-state disk and to read the fourth user data from the solid-state disk if the fourth user data are stored on the solid-state disk or from the RAID if the fourth user data are not stored on the solid-state disk. The parity module is further configured to generate a third parity data based on the third user data, the fourth user data, and the second parity data.

In another features, when the read module reads the fourth user data from the RAID, the parity module is further configured to generate a partial parity data based on the third user data and the second parity data read from the solid-state disk while the read module reads the fourth user data from the RAID and to generate the third parity data based on the partial parity data and the fourth user data read from the RAID.

In another feature, the write module is further configured to write the first user data and the second parity data to the solid-state disk before writing the second user data and the second parity data to the RAID, to store the second user data and the second parity data on the solid-state disk until the second user data and the second parity data are written on the RAID, and to rewrite the second user data and the second parity data from the solid-state disk to the RAID in response a member of the RAID failing while the second user data and the second parity data are being written to the RAID.

In other features, the system further comprises a failure detection module configured to detect when one of the disks of the RAID fails and a regeneration module configured to regenerate data stored on the one of the disks based on data stored on disks other than the one of the disks of the RAID and to store the regenerated data on the solid-state disk.

In other features, the write module is further configured to receive a first set of user data to write on members of a stripe of the RAID, and in response to receiving the first set of user data. The parity module is further configured to generate a first set of parity data corresponding to the first set of user data. The write module is further configured to accumulate the first set of user data and to write the accumulated first set of user data and the first set of parity data on the members of the stripe.

In other features, the read module is further configured to read from the members of the stripe a second set of user data and a corresponding second set of parity data, wherein the first set of user data modifies the second set of user data and to store on the solid-state disk the second set of user data and the second set of parity data. The parity module is further configured to generate the first set of parity data based on the first set of user data, the second set of user data, and the second set of parity data.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
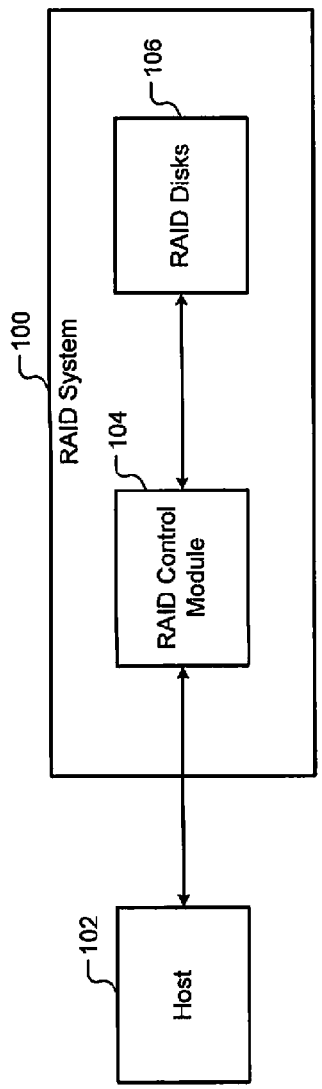
FIG. 1 is a functional block diagram of a Redundant Array of Independent Disks (RAID) system.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

In Redundant Array of Independent Disks (RAID) systems employing RAID levels 5 or 6 (i.e., RAID5 or RAID6), when new data is to be written over old data stored on a disk, new parity is computed by XORing the new data, the old data, and parity corresponding to the old data, where XOR denotes an exclusive OR operation. The new data and the new parity are then stored on the RAID. To compute the new parity, the old data and the parity corresponding to the old data (old parity) are read from the RAID before the new parity can be computed and before the new data and the new parity can be written on the RAID. Reading the old data and the old parity from the RAID to compute the new parity degrades write performance of the RAID. For example, a read operation needs to be performed before a write operation can be performed, which delays the write operation.

As explained below in detail, the present disclosure relates to caching old data and old parity in a solid-state disk to increase the speed of parity computations and write operations of the RAID. Additionally, the solid-state disk can be used to pre-fetch data and corresponding parity from the RAID to increase the speed of parity computations and write operations of the RAID. Further, when multiple write operations are to be performed on the RAID, the new data to be written on the RAID can be accumulated on a per-stripe basis in the solid-state disk. A new parity is computed only once for each accumulated stripe. The accumulated new data and the new parity can then be written on the disks in a single write operation.

In addition, as explained below in detail, data recovery in case of a disk failure can be improved by first writing the new data and new parity on the solid-state disk and then writing the new data and the new parity on the RAID. The new data and new parity may be retained in the solid-state disk for a predetermined period of time (e.g., until data gets written to disks). If a disk fails during the predetermined period of time (e.g., if the RAID fails before data gets written to RAID disks), the new data and the new parity are simply rewritten from the solid-state disk to the RAID. Further, the solid-state disk can be used to store regenerated data if a disk fails. The regenerated data can be retained in the solid-state disk until the failed disk is replaced.

Referring now to FIG. 1, a RAID system 100 communicates with a host 102. The RAID system 100 includes a RAID control module 104 and RAID disks 106. The RAID disks 106 include a plurality of disks. The RAID disks 106 are called members of the RAID system 100. Large amount of logically sequential data such as a file can be segmented into a plurality of segments. Each segment can be written on a different member along a stripe. When the large amount of data is requested, multiple segments on the stripe can read concurrently.

The level of protection provided by the RAID system 100 may be RAID5 or RAID6. The RAID control module 104 controls read/write operations of the RAID disks 106 according to the commands received from the host 102. The RAID control module 104 receives from the host 102 new user data to be written over old user data stored on the RAID disks 106. The RAID control module 104 reads the old user data and corresponding parity data from the RAID disks 106. The RAID control module 104 computes new parity data using the new user data received from the host 102 and the old user data and the old parity data read from the RAID disks 106. The RAID control module 104 writes the new user data and the new parity data on the RAID disks 106. A typical unit of user data and parity data may be a block (e.g., 512 bytes).

Figure 2:
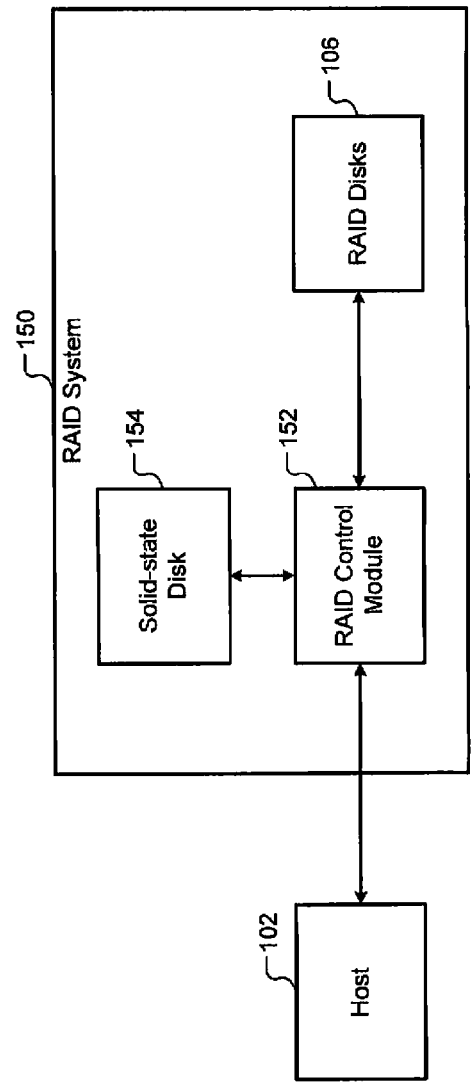
FIG. 2 is a functional block diagram of a RAID system that includes a solid-state disk cache.

Referring now to FIG. 2, a RAID system 150 communicates with the host 102. The RAID system 150 includes the RAID disks 106, a RAID control module 152, and a solid-state disk 154. The RAID control module 152 controls read/write operations of the RAID disks 106 according to the commands received from the host 102. Additionally, the RAID control module 152 uses the solid-state disk 154 as cache memory to increase the speed of parity computations and write operations as described below in detail.

Figure 3:
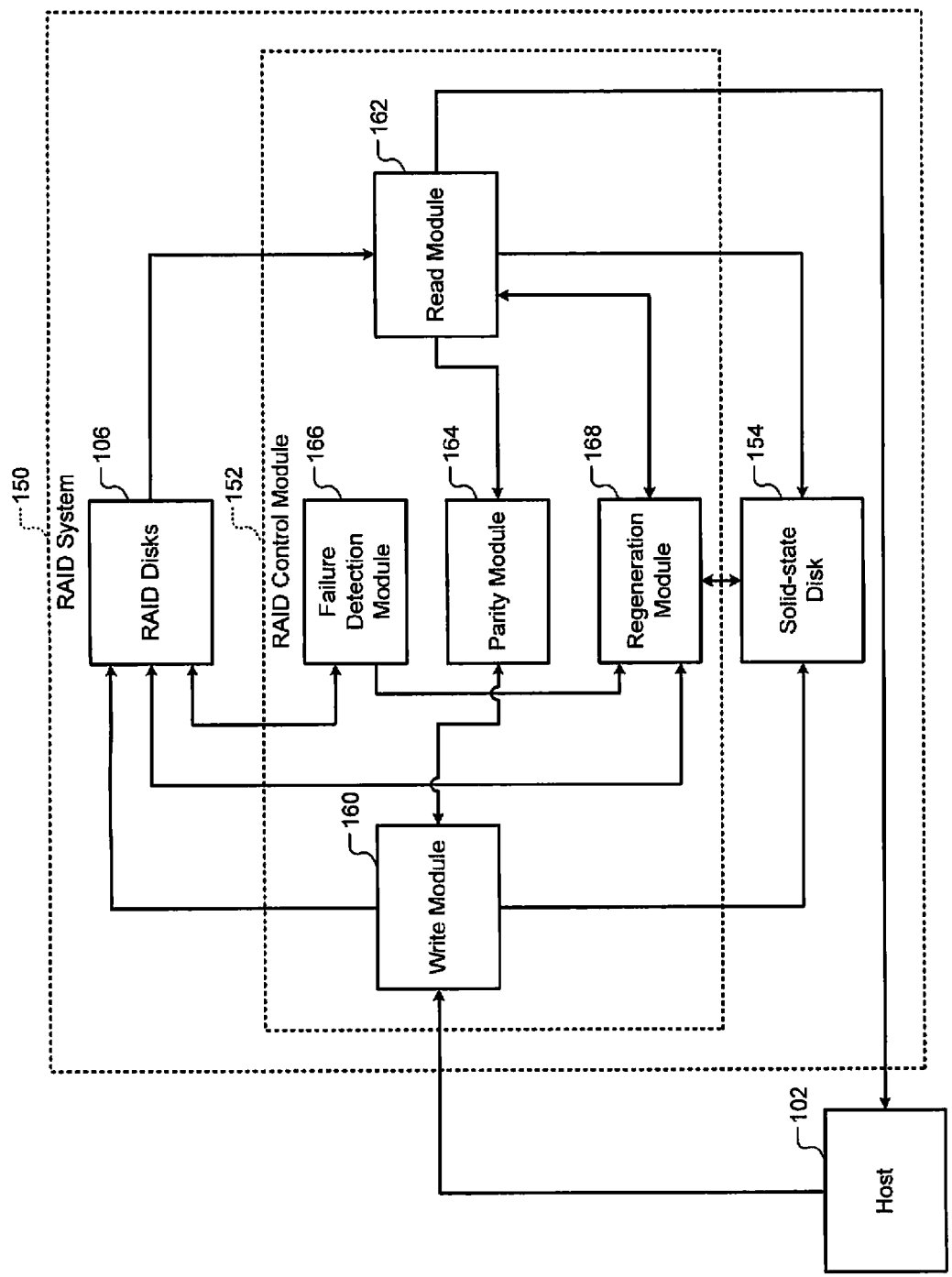
FIG. 3 is a detailed illustration of a RAID control module of the RAID system of FIG. 2.

Referring now to FIG. 3, the RAID control module 152 includes a write module 160, a read module 162, a parity module 164, a failure detection module 166, and a regeneration module 168. The write module 160 receives from the host 102 new data to be written over old data stored on the RAID disks 106. Suppose the write module 160 receives from the host 102 new data X' to be written over old data X stored on a member 0 of the RAID disks 106. The new data X' modifies the old data X stored on member 0.

The read module 162 reads the old data X and parity P corresponding to the old data X from the solid-state disk 154 or from the RAID disks 106. Specifically, the read module 162 initially looks up the solid-state disk 154 to determine if the old data X and parity P are stored on the solid-state disk 154. A cache miss occurs if the old data X or parity P are not stored on the solid-state disk 154. Subsequently, if the old data X or parity P are not stored on the solid-state disk 154, the read module 162 reads the old data X and/or parity P from the RAID disks 106.

The parity module 164 generates new parity P' based on the new data X', the old data X, and parity P. The parity module 164 XORs the new data X', the old data X, and parity P to generate the new parity P'. The write module 160 writes the new data X' and the new parity P' on the RAID disks 106. Additionally, the write module 160 writes the new data X' and the new parity P' on the solid-state disk 154.

Subsequently, the write module 160 may receive new data X" from the host 102 to be written over the old data X' stored on the member 0 of the RAID disks 106. When the read module 162 looks up the solid-state disk 154 to determine if the old data X' and corresponding parity P' are stored on the solid-state disk 154, a cache hit occurs since the old data X' and parity P' are stored on the solid-state disk 154. Consequently, the read module 162 does not read the old data X' and parity P' from the RAID disks 106. Instead, the read module 162 reads the old data X' and parity P' from the solid-state disk 154.

The parity module 164 generates new parity P'" based on the new data X", the old data X', and parity P'. The parity module 164 XORs the new data X", the old data X', and parity P' to generate the new parity P'". The write module 160 writes the new data X" and the new parity P'" on the RAID disks 106. Additionally, the write module 160 writes the new data X" and the new parity P'" on the solid-state disk 154. Thus, by caching data and corresponding parity on the solid-state disk 154, the RAID system 150 reduces the number of read operations performed on the RAID disks 106 while writing data on the RAID disks 106.

Alternatively, after writing the new data X' and parity P' on the solid-state disk 154 and the RAID disks 106, suppose the write module 160 receives new data Y' to be written over old data Y stored on a member 1 of the RAID disks 106, where the members 0 and 1 are on a stripe S of the RAID system 150. The new data Y' modifies the old data Y stored on the member 1 of the RAID disks 106. Data X' and data Y' belong to same stripe S but are written on different members of the stripe S (e.g., members 0 and 1, respectively).

The read module 162 initially looks up the solid-state disk 154 to determine if the old data Y and parity P' corresponding to the old data X' are stored on the solid-state disk 154. The read module 162 determines that while the old data Y from member 1 is not stored in the solid-state disk 154, parity P' is stored on the solid-state disk 154 (since the write module 160 wrote data X' and parity P' on the solid-state disk 154), and a partial cache hit occurs. Consequently, the read module 162 reads parity P' from the solid-state disk 154 and the old data Y from the member 1 of the RAID disks 106.

The parity module 164 generates partial parity data by XORing the new data Y' received from the host 102 and parity P' read from the solid-state disk 154. The parity module 164 generates the partial parity data while the read module 162 reads the old data Y from the member 1 of the RAID disks 106. After the read module 162 reads the old data Y from member 1, the parity module 164 generates new parity P'" by XORing the partial parity data and the old data Y. The write module 160 writes the new data Y' and the new parity P'" on the RAID disks 106 and the solid-state disk 154.

In response to a write operation to be performed on one member of a stripe of the RAID disks 106, the read module 162 can pre-fetch data from other members of the stripe into the solid-state disk 154 since a write operation to one member of a stripe can be followed by another write operation on another member of the stripe. For example, before receiving the new data Y' to be written on member 1, the read module 162 can read the old data Y from member 1 and store the old data Y in the solid-state disk 154 in response to receiving the new data X' to be written on member 0.

Accordingly, when the write module 160 receives the new data Y' to be written on member 1 after writing the new data X' on member 0, the read module 162 finds not only the parity P' but also the old data Y cached in the solid-state disk 154. Consequently, the read module 162 need not perform a read operation on the RAID disks 106 to read the old data Y, and the parity module 164 need not generate partial parity data. Instead, the parity module 164 generates the new parity P'" by XORing the new data Y' received from the host 102 and the parity P' and the old data Y received from the solid-state disk 154. The write module 160 writes the new data Y' and the new parity P'" on the RAID disks 106 and the solid-state disk 154. Thus, by pre-fetching data that may be updated and caching the data in the solid-state disk 154, the RAID system 150 can further reduce the number of read operations performed on the RAID disks 106 while writing data on the RAID disks 106.

If the RAID system 150 fails while an active write operation is pending, the parity of a stripe may be inconsistent with the data in the stripe. If the inconsistency is not detected and repaired before a disk or a block in a stripe fails, data loss can occur since incorrect parity will be used to reconstruct the failed disk or block in the stripe. This potential vulnerability is known as a write hole. Write-hole prevention ensures consistency of parity with data in case of a sudden failure.

For parity recovery to be successful, RAID systems may use nonvolatile memory to retain differential parity. Differential parity captures a change from old data to new data. For example, if old data bits are 1001 and new data bits are 1100, then the difference between the old data and the new data is 1001 XOR 1100=0101. The new data (1100) can be obtained by adding (i.e., XOR'ing) the difference (0101) and the old data (1001). Recovery process involves reading the differential parity retained in the nonvolatile memory, reading old data from all the disks (i.e., data from disks undergoing write before system crashed), computing new parity, and writing the new parity to the disks. Write operations to the stripe are blocked during the recovery process.

The speed of the recovery process can be increased by writing the new data and the new parity on the solid-state disk 154 before the new data and the new parity are written on the RAID disks 106 and by retaining the new data and the parity in the solid-state disk 154 for a predetermined period of time (e.g., until data get written to disks). If a disk fails during the predetermined period of time (e.g., if RAID system fails before data get written to RAID disks), the write module 160 simply rewrites the new data and the new parity from the solid-state disk 154 to the RAID disks 106. Since the read module 162 does not perform any read operations on the RAID disks 106 in the recovery process, the speed of the recovery process is increased.

The RAID system 150 may include a hot-spare or a spare disk used to replace a failed disk. That is, one of the RAID disks 106 may be a hot-spare that is used to replace a failed disk in the RAID disks 106. The failure detection module 166 detects when a disk in the RAID disks 106 fails. The regeneration module 168 regenerates the data that was stored on the failed disk using the data and parity stored on the remaining disks that are functioning properly. Specifically, the regeneration module 168 XORs the data and parity stored on the remaining disks to regenerate the data that was stored on the failed disk. In some implementations, the parity module 164 and the regeneration module 168 may be implemented by a single XOR engine.

The regenerated data is cached in the solid-state disk 154. Caching the regenerated data in the solid-state disk 154 reduces the number of accesses to the RAID disks 106, which would otherwise be performed during read/write operations to the RAID disks 106. The regenerated data is retained in the solid-state disk 154 until the failed disk is replaced and the regenerated data from the failed disk is restored on the replacement disk. The speed of regeneration can be increased by pre-fetching the data and parity stored on the remaining disks into the solid-state disk 154.

When multiple write operations are to be performed, the write module 160 can accumulate in the solid-state disk 154 new data and new parity to be written on the RAID disks 106 instead of writing each of the new data and the new parity on the RAID disks 106 in independent write operations. The write module 160 can then write the accumulated new data and the accumulated new parity on the RAID disks 106 in a single write operation.

Writing data accumulated in the solid-state disk 154 to the RAID disks 106 is called flushing. Flushing rates and resource utilization between the solid-state disk 154, the RAID disks 106, and the RAID control module 152 can be improved as follows. The solid-state disk 154 can generate a list of stripes that will be flushed to the RAID disks 106 in a next cycle along with data maps for the stripes. Based on the list of stripes and the data maps, the read module 162 can then start pre-fetching old data from the RAID disks 106 into the solid-state disk 154 before flushing begins. When flushing begins, most of the old data will already be cached in the solid-state disk 154, which increases the speed of flushing. The techniques described herein improve resource pipelining between the solid-state disk 154, the RAID disks 106, and the RAID control module 152.

Figure 4:
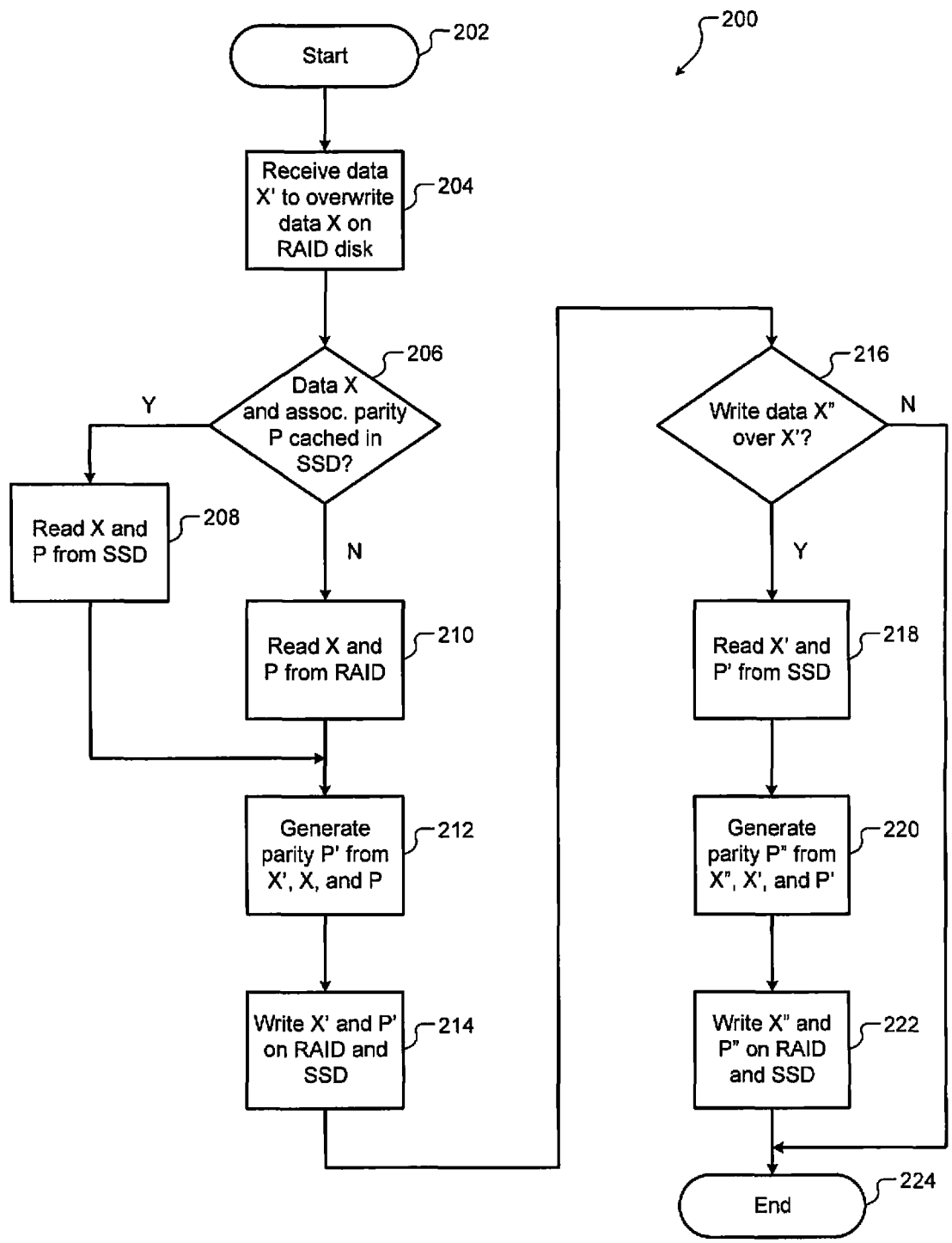
FIGS. 4 and 5 depict flowcharts of methods for writing data on the RAID system of FIG. 2.

Referring now to FIG. 4, a method 200 for writing data on the RAID system 150 is shown. Control begins at 202. At 204, control receives data X' to overwrite data X stored on a member of the RAID disks 106. At 206, control determines if data X and/or associated parity P are cached in the solid-state disk 154. At 208, control reads data X and/or associated parity P from the solid-state disk 154 if data X and/or parity P are cached in the solid-state disk 154. At 210, control reads data X and/or parity P from the RAID disks 106 if data X and/or parity P are not cached in the solid-state disk 154. In other words, either data X or parity P can be present/absent in the cache (i.e., the solid-state disk 154). Whatever is not present in the cache is read from the RAID disks 106. At 212, control generates parity P' by XORing data X', data X, and parity P. At 214, control writes data X' and parity P' on the RAID disks 106 and the solid-state disk 154.

At 216, control determines if data X" is received to overwrite data X' stored on the RAID disks 106. Control ends at 224 if data X" is not received. At 218, if data X" is received, control reads data X' and parity P' stored on the solid-state disk 154 instead of reading data X' and parity P' from the RAID disks 106. At 220, control generates parity P'' by XORing data X", data X', and parity P'. At 222, control writes data X" and parity P'' on the RAID disks 106 and the solid-state disk 154. Control ends at 224.

Figure 5:
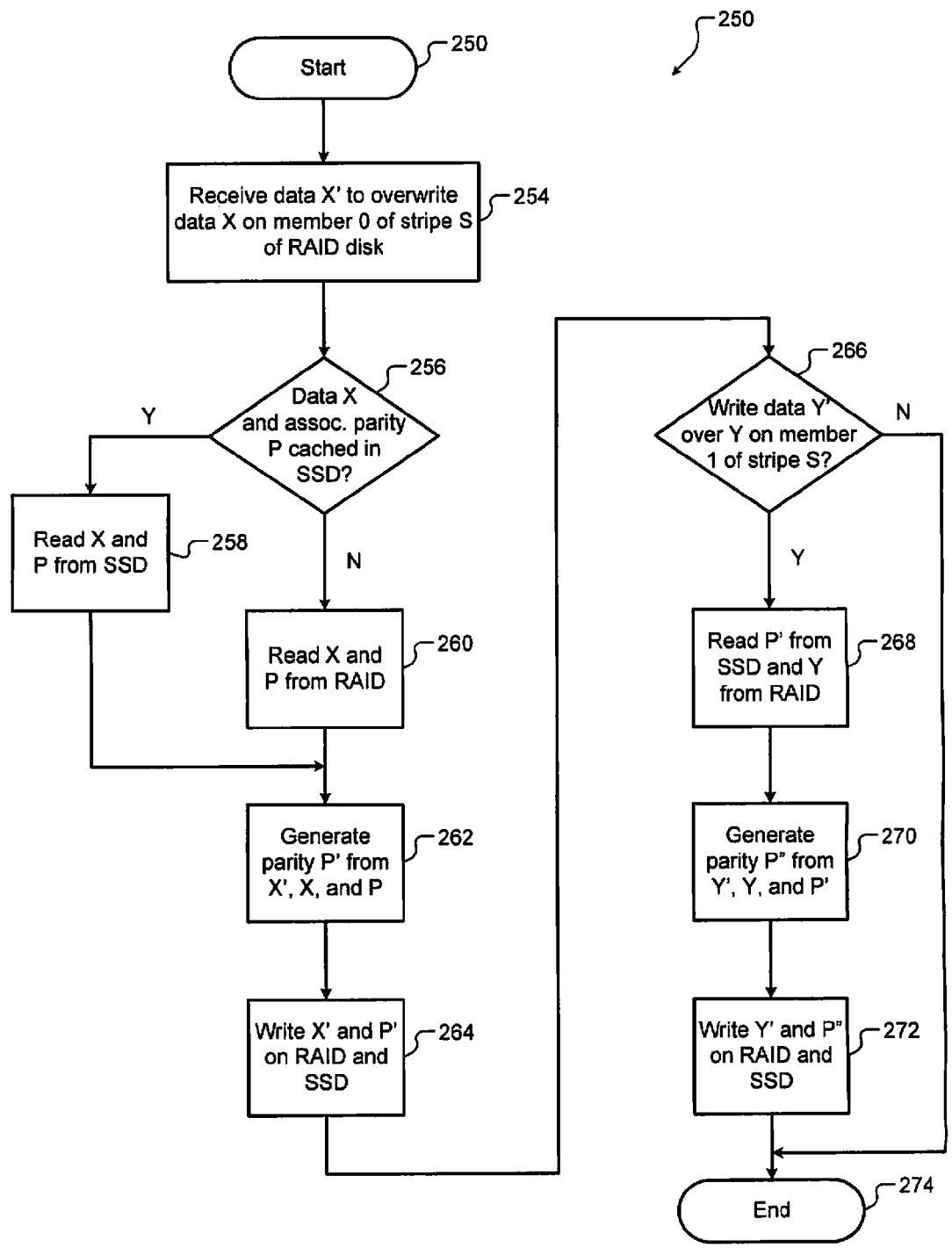

Referring now to FIG. 5, a method 250 for writing data on the RAID system 150 is shown. Control begins at 252. At 254, control receives data X' to overwrite data X stored on the member 0 of stripe S of the RAID disks 106. At 256, control determines if data X and associated parity P are cached in the solid-state, disk 154. At 258, control reads data X and/or parity P from the solid-state disk 154 if data X and/or parity P are cached in the solid-state disk 154. At 260, control reads data X and/or parity P from the RAID disks 106 if data X and/or parity P are not cached in the solid-state disk 154. In other words, either data X or parity P can be present/absent in the cache (i.e., the solid-state disk 154). Whatever is not present in the cache is read from the RAID disks 106. At 262, control generates parity P' by XORing data X', data X, and parity P. At 264, control writes data X' and parity P' on the RAID disks 106 and the solid-state disk 154.

At 266, control determines if data Y' is received to overwrite data Y stored on the member 1 of stripe S of the RAID disks 106. Control ends at 224 if data Y' is not received. At 268, if data Y' is received, control reads data Y from the RAID disks 106 and parity P' from the solid-state disk 154 instead of reading parity P' from the RAID disks 106. At 270, control generates parity P'' by XORing data Y', data Y, and parity P'. At 272, control writes data Y' and parity P'' on the RAID disks 106 and the solid-state disk 154. Control ends at 274.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
    a write module configured to modify first user data stored on a first member of a redundant array of independent disks (RAID) using second user data;
    a read module configured to read the first user data and first parity data corresponding to the first user data
        from a solid-state disk associated with the RAID if at least one of the first user data and the first parity data are stored on the solid-state disk, wherein the solid-state disk is separate from the RAID; or
        directly from the RAID if the at least one of the first user data and the first parity data are not stored on the solid-state disk; and
    a parity module configured to generate second parity data based on the first user data, the second user data, and the first parity data.

2. The system of claim 1, wherein the write module is further configured to:
    write the second parity data on the RAID in response to writing the second user data on the first member, and
    write the second user data and the second parity data on the solid-state disk.

3. The system of claim 2, wherein:
    the write module is further configured to write third user data to a second member of the RAID after writing the second user data and the second parity data on the RAID and the solid-state disk, wherein the third user data modifies fourth user data stored on the second member;
    the read module is further configured to
        read the second parity data from the solid-state disk, and
        read the fourth user data from the solid-state disk if the fourth user data are stored on the solid-state disk or from the RAID if the fourth user data are not stored on the solid-state disk; and
    the parity module is further configured to generate a third parity data based on the third user data, the fourth user data, and the second parity data.

4. The system of claim 3, wherein the write module is further configured to:
    write the third parity data on the RAID in response to writing the third user data on the second member, and write the third user data and the third parity data on the solid-state disk.

5. The system of claim 3, wherein when the read module reads the fourth user data from the RAID, the parity module is further configured to:
generate a partial parity data based on the third user data and the second parity data read from the solid-state disk while the read module reads the fourth user data from the RAID; and
generate the third parity data based on the partial parity data and the fourth user data read from the RAID.

6. The system of claim 2, wherein in response to the write module writing the first user data on the first member of a stripe of the RAID, the read module is further configured to
read third user data from a second member of the stripe before receiving fourth user data to write on the second member, wherein the fourth user data modifies the third user data, and
store the third user data on the solid-state disk.

7. The system of claim 6, wherein:
the write module is further configured to write the fourth user data on the second member after writing the second user data on the first member;
the read module is further configured to read the second parity data and the third user data from the solid-state disk; and
the parity module is further configured to generate a third parity data based on the third user data, the fourth user data, and the second parity data.

8. The system of claim 2, wherein the write module is further configured to:
write the first user data and the second parity data to the solid-state disk before writing the second user data and the second parity data to the RAID;
store the second user data and the second parity data on the solid-state disk until the second user data and the second parity data are written on the RAID; and
rewrite the second user data and the second parity data from the solid-state disk to the RAID in response a member of the RAID failing while the second user data and the second parity data are being written to the RAID.

9. The system of claim 1, further comprising:
a failure detection module configured to detect when one of the disks of the RAID fails; and
a regeneration module configured to
regenerate data stored on the one of the disks based on data stored on disks other than the one of the disks of the RAID, and
store the regenerated data on the solid-state disk.

10. The system of claim 9, wherein:
the read module is further configured to
read a portion of data stored on the disks other than the one of the disks of the RAID, and
store the portion in the solid-state disk; and
the regeneration module is further configured to regenerate the data using the portion stored in the solid-state disk.

11. The system of claim 1, wherein the write module is further configured to receive a first set of user data to write on members of a stripe of the RAID, and in response to receiving the first set of user data:
the parity module is further configured to generate a first set of parity data corresponding to the first set of user data; and
the write module is further configured to
accumulate the first set of user data; and
write the accumulated first set of user data and the first set of parity data on the members of the stripe.

12. The system of claim 11, wherein:
the read module is further configured to
read from the members of the stripe a second set of user data and a corresponding second set of parity data, wherein the first set of user data modifies the second set of user data, and
store on the solid-state disk the second set of user data and the second set of parity data; and
the parity module is further configured to generate the first set of parity data based on the first set of user data, the second set of user data, and the second set of parity data.

13. A method comprising:
modifying first user data stored on a first member of a redundant array of independent disks (RAID) using second user data;
reading the first user data and first parity data corresponding to the first user data
from a solid-state disk associated with the RAID if at least one of the first user data and the first parity data are stored on the solid-state disk, wherein the solid-state disk is separate from the RAID; or
directly from the RAID if the at least one of the first user data and the first parity data are not stored on the solid-state disk; and
generating second parity data based on the first user data, the second user data, and the first parity data.

14. The method of claim 13, further comprising:
writing the second parity data on the RAID in response to writing the second user data on the first member;
writing the second user data and the second parity data on the solid-state disk;
writing third user data to a second member of the RAID after writing the second user data and the second parity data on the RAID and the solid-state disk, wherein the third user data modifies fourth user data stored on the second member;
reading the second parity data from the solid-state disk;
reading the fourth user data from the solid-state disk if the fourth user data are stored on the solid-state disk or from the RAID if the fourth user data are not stored on the solid-state disk;
generating a third parity data based on the third user data, the fourth user data, and the second parity data;
writing the third parity data on the RAID in response to writing the third user data on the second member; and
writing the third user data and the third parity data on the solid-state disk.

15. The method of claim 13, further comprising:
writing the second parity data on the RAID in response to writing the second user data on the first member;
writing the second user data and the second parity data on the solid-state disk;
writing third user data to a second member of the RAID after writing the second user data and the second parity data on the RAID and the solid-state disk, wherein the third user data modifies fourth user data stored on the second member;
reading the second parity data from the solid-state disk;
reading the fourth user data from the solid-state disk if the fourth user data are stored on the solid-state disk or from the RAID if the fourth user data are not stored on the solid-state disk;
generating a third parity data based on the third user data, the fourth user data, and the second parity data;
in response to reading the fourth user data from the RAID, generating a partial parity data based on the third user data and the second parity data read from the solid-state disk while reading the fourth user data from the RAID; and generating the third parity data based on the partial parity data and the fourth user data read from the RAID.

16. The method of claim 13, further comprising:

writing the second parity data on the RAID in response to writing the second user data on the first member;

writing the second user data and the second parity data on the solid-state disk;

in response writing the first user data on the first member of a stripe of the RAID, reading third user data from a second member of the stripe before receiving fourth user data to write on the second member, wherein the fourth user data modifies the third user data;

storing the third user data on the solid-state disk;

writing the fourth user data on the second member after writing the second user data on the first member;

reading the second parity data and the third user data from the solid-state disk; and generating a third parity data based on the third user data, the fourth user data, and the second parity data.

17. The method of claim 13, further comprising:

writing the second parity data on the RAID in response to writing the second user data on the first member;

writing the second user data and the second parity data on the solid-state disk;

writing the first user data and the second parity data to the solid-state disk before writing the second user data and the second parity data to the RAID;

storing the second user data and the second parity data on the solid-state disk until the second user data and the second parity data are written on the RAID; and rewriting the second user data and the second parity data from the solid-state disk to the RAID in response a member of the RAID failing while the second user data and the second parity data are being written to the RAID.

18. The method of claim 13, further comprising:

detecting when one of the disks of the RAID fails;

regenerating data stored on the one of the disks based on data stored on disks other than the one of the disks of the RAID;

storing the regenerated data on the solid-state disk;

reading a portion of data stored on the disks other than the one of the disks of the RAID;

storing the portion in the solid-state disk; and regenerating the data using the portion stored in the solid-state disk.

19. The method of claim 13, further comprising:

receiving a first set of user data to write on members of a stripe of the RAID;

generating a first set of parity data corresponding to the first set of user data;

accumulating the first set of user data; and writing the accumulated first set of user data and the first set of parity data on the members of the stripe.

20. The method claim 19, further comprising:

reading from the members of the stripe a second set of user data and a corresponding second set of parity data, wherein the first set of user data modifies the second set of user data;

storing on the solid-state disk the second set of user data and the second set of parity data; and generating the first set of parity data based on the first set of user data, the second set of user data, and the second set of parity data.

\* \* \* \* \*